United States Patent
Bedford et al.

(10) Patent No.: US 6,631,961 B1
(45) Date of Patent: Oct. 14, 2003

(54) ISOLATED RIM IDLER

(75) Inventors: Billy R. Bedford, Peoria, IL (US); Gregory B. Moebs, East Peoria, IL (US); Abram T. Valencic, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/940,004

(22) Filed: Aug. 27, 2001

(51) Int. Cl.[7] .................. B62D 55/088; B62D 55/14
(52) U.S. Cl. .................. 305/136; 305/100; 305/137
(58) Field of Search .................. 305/136, 137, 305/199, 100, 115; 295/7, 11

(56) References Cited

U.S. PATENT DOCUMENTS

| | | | |
|---|---|---|---|
| 1,851,561 A | * | 3/1932 | Baninger |
| 2,295,270 A | * | 9/1942 | Piron .................. 295/11 |
| 2,911,252 A | * | 11/1959 | Templeton |
| 3,127,211 A | * | 3/1964 | Kordes et al. |
| 3,915,511 A | | 10/1975 | Clasper et al. |
| 3,960,412 A | * | 6/1976 | Shuler |
| 4,069,856 A | | 1/1978 | Sogge |
| 4,111,064 A | | 9/1978 | Purcell |
| RE30,039 E | * | 6/1979 | Clemens et al. |
| 4,203,633 A | | 5/1980 | Hare |
| 4,278,303 A | | 7/1981 | Livesay |
| 4,818,041 A | * | 4/1989 | Oertley |
| 5,207,489 A | | 5/1993 | Miller |
| 6,012,784 A | * | 1/2000 | Oertley .................. 305/137 |

FOREIGN PATENT DOCUMENTS

| | | | |
|---|---|---|---|
| DE | 732327 | 2/1943 | |
| GB | 424701 | * 2/1935 | .................. 295/7 |
| JP | 57-66077 | 4/1982 | |

* cited by examiner

Primary Examiner—Russell D. Stormer
(74) Attorney, Agent, or Firm—Calvin E Glastetter; Jeff A Greene

(57) ABSTRACT

An idler wheel assembly, which supports and guides an endless track and provides sound suppression, and a method for providing sound suppression of an undercarriage of a machine. The idler wheel assembly includes a hub having a first side surface and a second side surface onto which a plurality of segments are connected. Each of the plurality of segments has a first flange positioned adjacent the first side surface of the hub, and a second flange positioned adjacent the second side surface. At least one isolation device may be mounted between the hub and at least one of the plurality of segments to provide sound suppression.

18 Claims, 4 Drawing Sheets

ISOLATED RIM IDLER

TECHNICAL FIELD

The present invention relates to a track idler wheel assembly, and in particular to a track idler wheel assembly that provides sound suppression, and a method for providing sound suppression of an undercarriage of a machine, by changing the track link to idler impact characteristics of the track idler wheel assembly.

BACKGROUND

Operator comfort, as well as noise reduction regulations, requires reducing the sound decibel level emanating from a machine. Perhaps one of the greatest sources of machine noise in earthmoving equipment and construction machines is a track chain contacting the undercarriage components of the equipment or machine. Typically, these earthmoving and construction machines operate using self-laying endless track chain assemblies. Idler wheels are used to guide and support portions of this track chain. Since the track chain assemblies and idler wheel surfaces are manufactured using metal components, noise and vibration are generated between the track chain assemblies and the idler wheels. This noise is then transmitted to, and typically amplified by, the hub of the idler wheel and the track chain assemblies.

One type of idler-wheel assembly used for isolating wear segments from an idler wheel hub is disclosed in U.S. Pat. No. 4,818,041 issued to Caterpillar Inc. on Apr. 4, 1989. In this patent, U-shaped cavities are formed in the wheel assembly hub in which resilient rings are placed. The resilient rings are held in the cavities by hardened metal wear segments. The wear segments are clamped to the assembly by clamping plates secured to the hub by fasteners. However, a disadvantage of this idler wheel assembly is that it requires extensive casting and machining of the hub and the metal wear segments to form the shape of cavities and segments. In addition, the use of a clamping plate provides additional costs, as well as creates metal to metal contact between the clamping plate and the metal wear segments.

Accordingly, the present invention is directed to overcoming the problems as set forth above. The present invention overcomes the need for the use of a clamping plate, as well as reduces the amount of casting and machining of the hub and wear segments. Further, sound isolation can additionally be provided using, for example, sleeves on connectors which secure the segments to the hub.

SUMMARY OF THE INVENTION

The present invention provides an idler wheel assembly, which supports and guides an endless track and provides sound suppression, and a method for providing sound suppression of an undercarriage of a machine. In an embodiment of the present invention, the idler wheel assembly includes a hub having a first side surface and a second side surface onto which a plurality of segments are connected. Each of the plurality of segments has a first flange positioned adjacent the first side surface of the hub, and a second flange positioned adjacent the second side surface of the hub. At least one isolation device may be mounted between the hub and at least one of the plurality of segments to provide sound suppression.

According to a method for suppressing sound of an undercarriage of a machine according to the present invention, an isolation device is positioned between a hub of an idler wheel assembly and at least one of a plurality of segments of the wheel assembly. A first flange of the at least one of a plurality of segments is connected to an adjacent first side surface of the hub, and a second flange of the at least one of a plurality of segments is connected to an adjacent second side surface of the hub.

DETAILED DESCRIPTION

Figure 1:
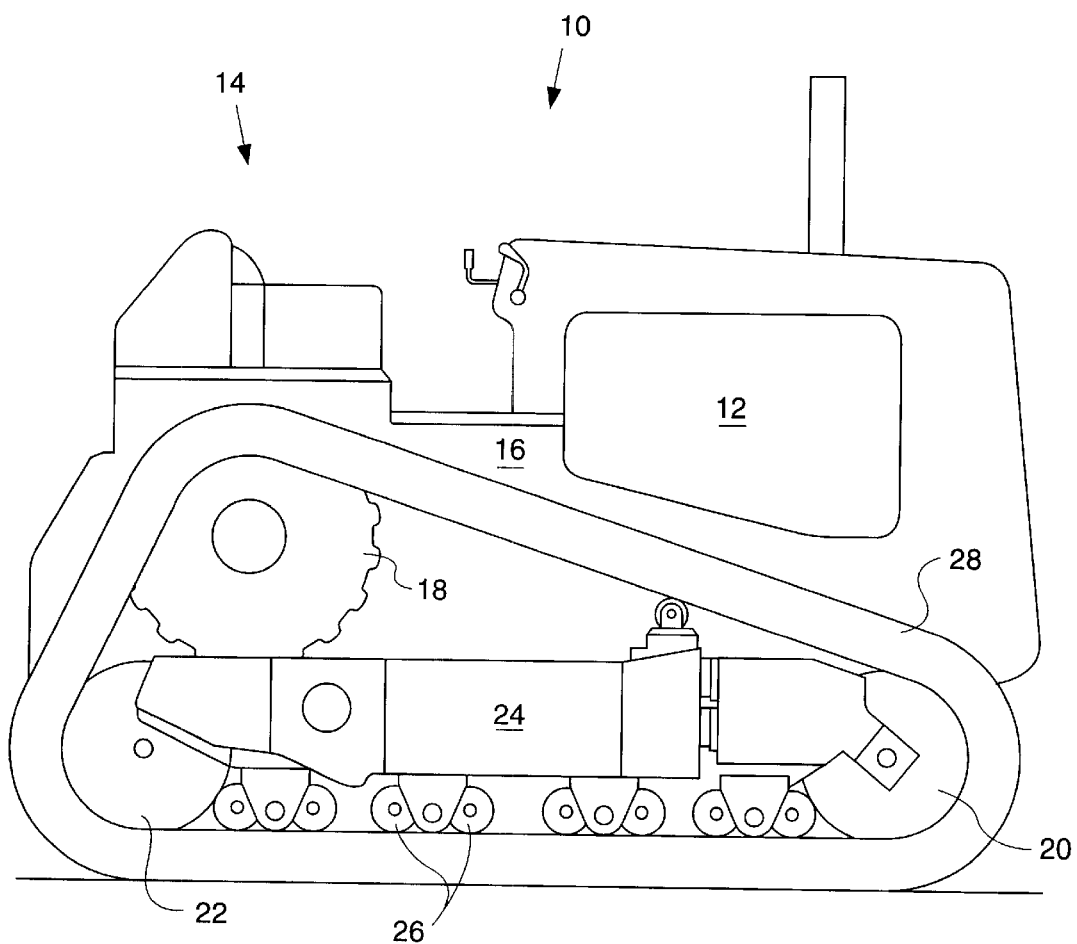
FIG. 1 illustrates a track type machine having an idler wheel assembly according to the present invention.

Referring to the drawings, a track type machine 10 includes an engine 12, an operator's station 14, a main frame 16, a powered sprocket 18, and front and rear idler wheel assemblies 20 and 22. The main frame 16 supports a subframe 24, which in turn supports the idler wheel assemblies 20 and 22, as well as a plurality of guide roller assemblies 26. An endless track 28 is driven by the sprocket 18 and encircles the idler wheel assemblies 20,22 and the roller assemblies 26. The idler wheel assemblies 20,22 are substantially similar and, therefore, only the front idler assembly 20 will be described in detail.

Figure 2:
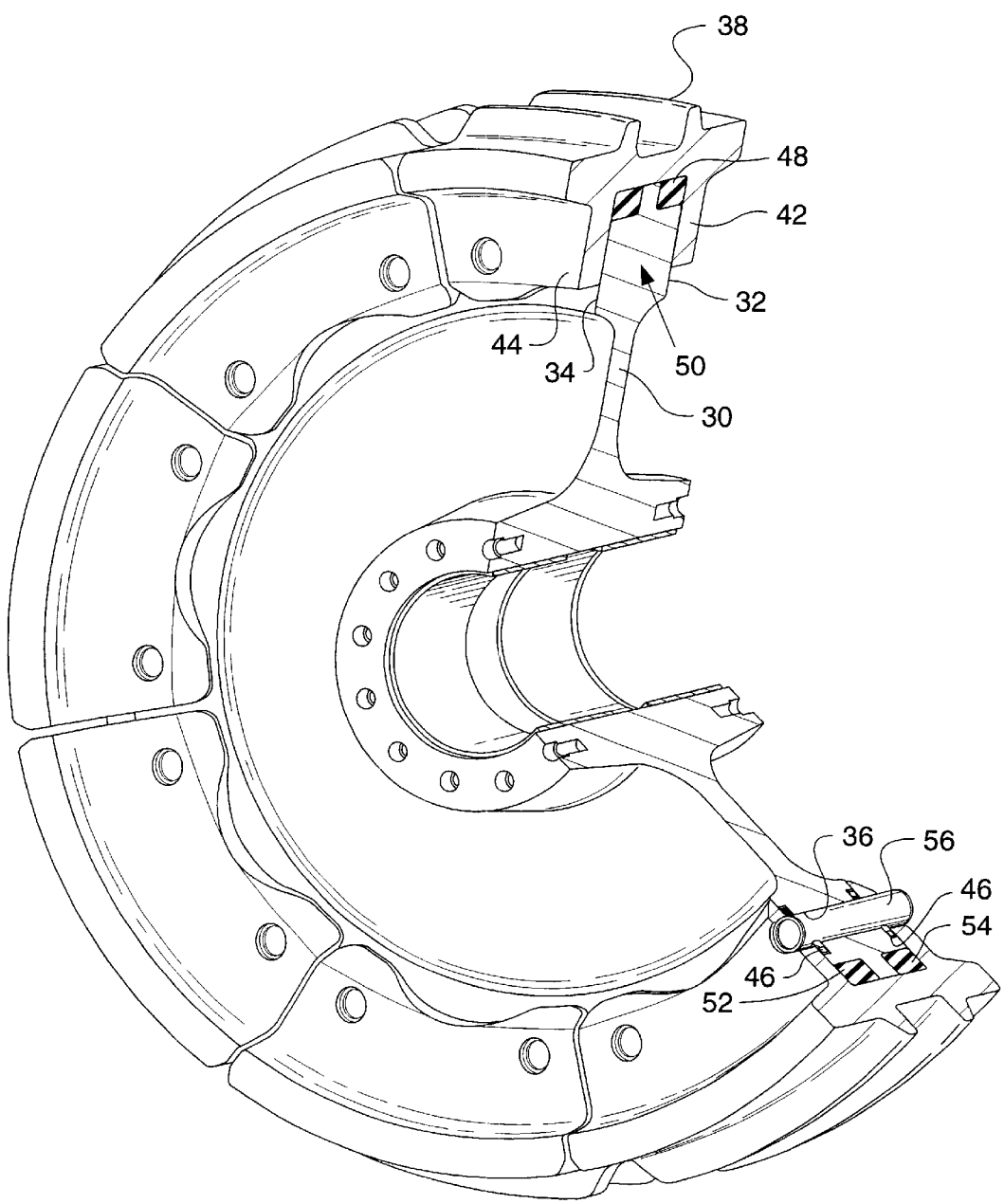
FIG. 2 is a partial sectional view of an idler wheel assembly according to an embodiment of the present invention.
Figure 3:
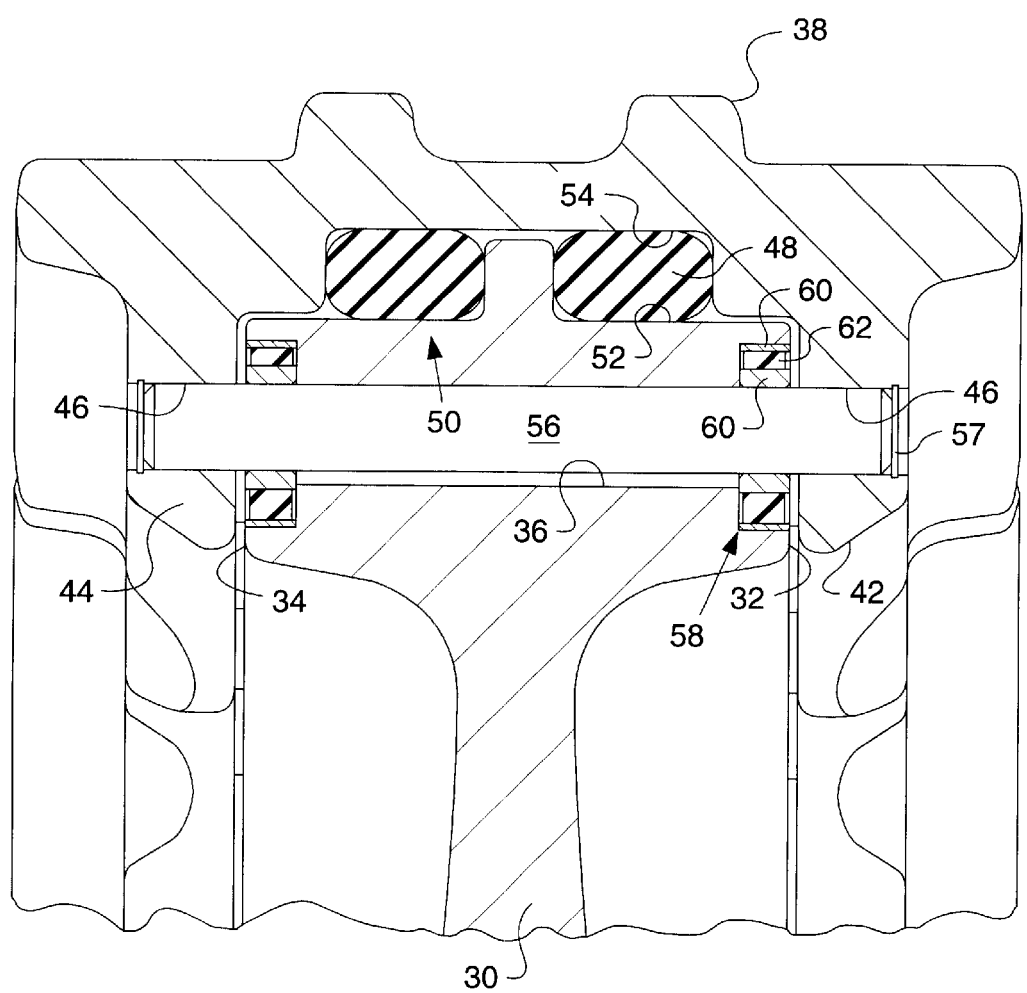
FIG. 3 illustrates a sectional view of the idler wheel assembly according to the preset invention.

With particular reference to FIGS. 2 and 3, the idler wheel assembly 20 which supports and guides the endless track 28, includes a hub 30, which may have a first side surface 32 and a second side surface 34. A plurality of hub mounting holes 36 may extend between the first side surface 32 and the second side surface 34 of the hub. Connectors that are fit within holes 36 may be used to mount a plurality of U-shaped segments 38 to the hub 30. Of course, the plurality of U-shaped segments 38 may be mounted or connected to the hub 30 by other ways known to those of ordinary skill in the art.

As further shown in FIGS. 2 and 3, each of these U-shaped segments 38 may have a first flange 42 positioned adjacent the first side surface 32 of the hub 30, and a second flange 44 positioned adjacent the second side surface 34 of the hub 30. Further, each of the U-shaped segments 38 may have holes 46 aligned with respective mounting holes 36 of the hub 30.

Isolation devices 48 are mounted between at least one of the U-shaped segments 38 and the hub 30 of the idler wheel assembly 20 to provide isolation. In one embodiment of the present invention, elastomeric torics are used as the isolation devices 48. The elastomeric torics 48 may be pre-loaded at assembly for load-carrying capacity purposes. Each of the elastomeric torics 48 may be contained within a space 50 defined by a groove 52 formed in the hub, and a corresponding groove 54 formed within one of the plurality of U-shaped segments 38. In the embodiment shown in FIGS. 2 and 3, the space 50 is substantially quadrangular in shape.

Pins 56, or other structures serving as a connector, may be positioned within the mounting holes 36 of the hub and respective holes 46 to attach the U-shaped segments 38 to the hub 30. The pins 56 or other connectors can be secured to the U-shaped segments 38 by retaining rings 57, or by other ways known to those skilled in the art. In the embodiment of the present invention shown in FIG. 3, the pins 56 or other connectors may also have sleeves 58 which can be used to seal the cavity between the pins 56 and the mounting holes 36 in the hub. As an example, the sleeves 58 may have metallic rings 60 which contain an elastic material 62, such as rubber, within the center of the metallic rings 60. The sleeves 58, including the elastic material or other sound-dampening material also help to provide sound isolation.

Figure 4:
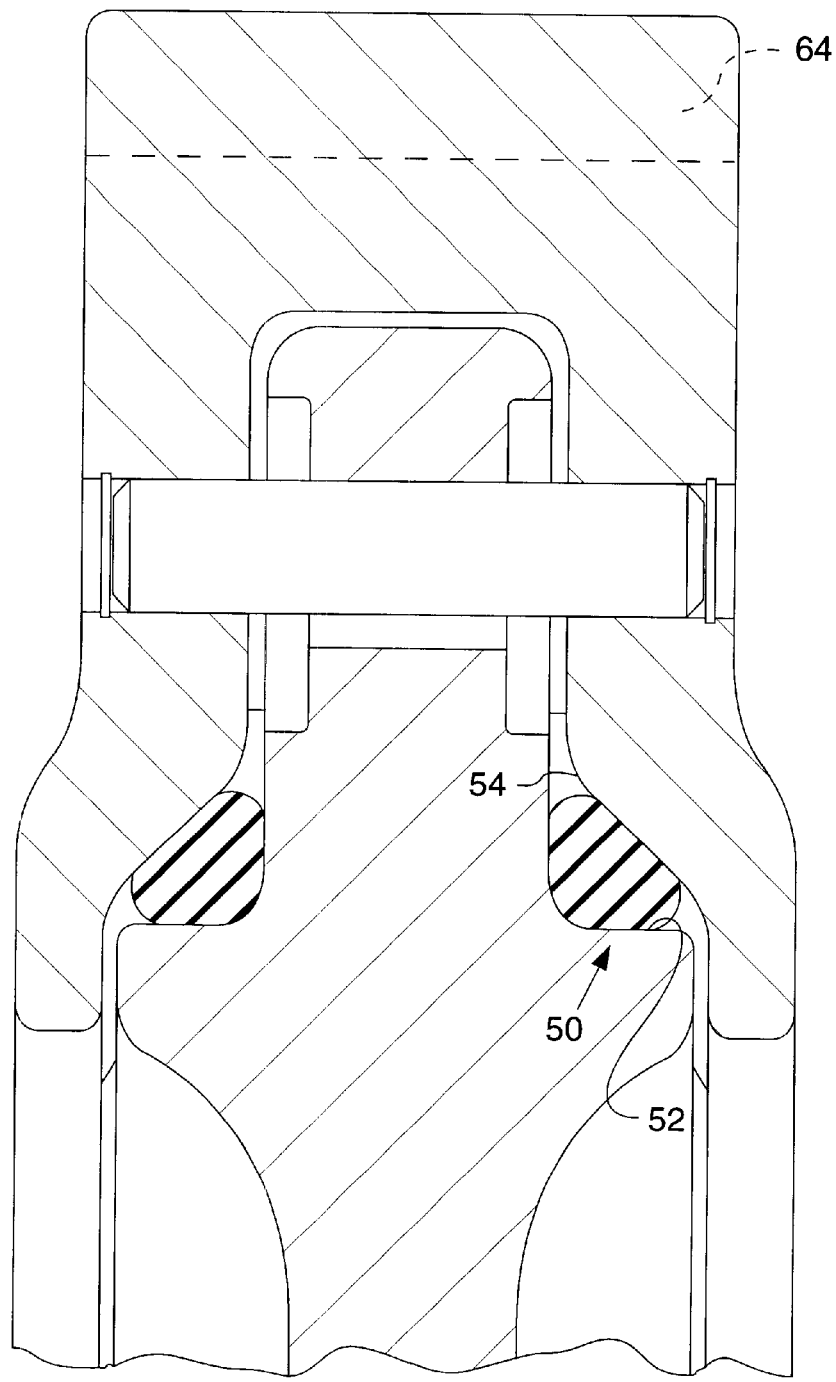
FIG. 4 illustrates a sectional view of another embodiment of an idler wheel assembly according to the present invention.

FIG. 4 illustrates another embodiment of an idler-wheel assembly according to the present invention. Items shown in FIG. 4 that are essentially similar to those shown in FIGS. 2 and 3, retain their same numerical identification. In FIG. 4, the U-shaped segments 38 can have one or more sprocket teeth 64 which can be used to guide the endless track 28 (not shown). As shown in FIG. 4, the space 50 defined by a groove 52 formed in the hub, and a corresponding groove 54 formed within one of the plurality of segments is triangular in shape. In this embodiment, a hypotenuse of the triangular-shaped space is formed by the corresponding groove 54 formed within one of the plurality of segments. Placing the elastomeric torics 48 in the triangular-shaped space can provide both radial and axial load-carrying capacity, and also allows for at least one of the U-shaped segments 38 to be brought down radially at assembly of the idler wheel assembly 20 to pre-load the elastomeric torics 48. Of course, the elastomeric torics 48 may be also be contained within other shaped spaces. As shown in FIG. 4, pins 56 or other connectors do not necessarily have sleeves 58, such as those shown in the embodiment depicted in FIG. 2.

INDUSTRIAL APPLICABILITY

In practice, the present invention provides for sound suppression by changing the track-link to idler impact characteristics by isolating the idler rim segments from the hub of the idler. Since isolation is provided between at least one of the segments 38 and the hub 30 of the idler wheel assembly 20 by an isolation device 48, neither the hub 30 of the idler wheel assembly nor the endless track 28 realizes the full impact of the idler wheel assembly's interface with the endless track 28. As such, sound is not transmitted to the hub 30. This is particularly important because sound is usually amplified by the hub 30.

Further sound suppression can be provided by sleeves 58 of connectors 56, which have metallic rings 60 with an elastic material 62, such as rubber, within the center of the metallic rings 60. The use of the isolation device and the sleeves allow for an idler wheel assembly that increases operator comfort by reducing the sound decibel level emanating from a machine.

In view of the foregoing, it is readily apparent that the structure of the present invention provides an idler arrangement wherein the idler rim segments are isolated from the hub to provide sound suppression by changing the track link impact characteristics of the track idler assembly.

Other aspects, objects, and advantages of this invention can be obtained from a study of the drawings, the disclosure and the appended claims.

What is claimed is:

1. An idler wheel assembly for a track type machine comprising:
   a hub having a first side surface, a second side surface and an outer circumferential surface;
   a plurality of segments connected to the hub, each segment having a first flange extending generally radially inward juxtaposed the first side surface of the hub, and a second flange extending generally radially inward juxtaposed the second side surface of the hub; and
   at least one isolation device positioned on the outer circumferential surface of said hub between the hub and at least one of the plurality of segments.

2. An idler wheel assembly according to claim 1, including:
   a plurality of hub mounting holes extending between the first side surface and the second side surface of the hub;
   a plurality of holes positioned in at least one of the plurality of segments, said plurality of holes align with respective hub mounting holes; and
   connectors positioned within the plurality of hub mounting holes and the plurality of holes operable to connect the at least one of the plurality of segments to the hub.

3. An idler wheel assembly according to claim 1, wherein the at least one isolation device is mounted between the hub and each of the plurality of segments.

4. An idler wheel assembly according to claim 1, wherein the at least one isolation device comprises an elastomeric toric.

5. An idler wheel assembly according to claim 2, including at least one sleeve operative with respect to at least one connector.

6. An idler wheel assembly according to claim 5, wherein the at least one sleeve comprises a metallic ring, the metallic ring containing an elastic material within a center of the metallic ring.

7. An idler wheel assembly according to claim 1, wherein the at least one of the plurality of segments is U-shaped.

8. An idler wheel assembly according to claim 7, wherein the U-shaped segment includes at least one sprocket tooth.

9. An idler wheel assembly according to claim 1, wherein the at least one isolation device is contained within a space defined by a groove formed in the hub, and a corresponding groove formed within one of the plurality of segments.

10. An idler wheel assembly according to claim 9, wherein the space is substantially quadrangular in shape.

11. An idler wheel assembly according to claim 9, wherein the space is substantially triangular in shape.

12. An idler wheel assembly according to claim 11, wherein a hypotenuse of the triangular-shaped space is formed by the corresponding groove formed within one of the plurality of segments.

13. An idler wheel assembly according to claim 2, wherein the connectors include pins, the pins being secured to the plurality of segments by retaining rings.

14. An idler wheel assembly according to claim 2, wherein the plurality of holes for at least one of the plurality of segments are slightly larger in diameter than the connectors.

15. An idler wheel assembly according to claim 14, wherein a seal is formed interposed the plurality of holes and the first side surface and the second side surfaces of the hub.

16. An idler wheel assembly according to claim 4, wherein the elastomeric toric comprises urethane.

17. An idler wheel assembly according to claim 16, wherein a hardness of the urethane is substantially 60 durometer.

18. An idler wheel assembly according to claim 4, wherein the elastomeric toric has an oval cross-section.

* * * * *